Patented Mar. 22, 1949

2,464,927

UNITED STATES PATENT OFFICE 2,464,927

ANTIOXIDANT

Lloyd A. Hall and Leon Lee Gershbein, Chicago, Ill., assignors to The Griffith Laboratories, Inc., a corporation of Illinois No Drawing. Application June 11, 1945, Serial No. 598,900

16 Claims. (Cl. 260—398.5)

This invention relates to methods and materials known as antioxidants, and more particularly to a synergistic antioxidant composition including a vegetable oil carrier, tocopherols, and a low alkyl ester of gallic acid with or without lecithin, and an ascorbyl fatty acid ester, for preserving and stabilizing oils, fats, and food products containing the same by retarding oxidation and the development of rancidity therein. It is an object of the invention to provide an improved synergistic antioxidant material for preserving and stabilizing such food substances as lard, oleo oil, butter, peanut butter, mayonnaise, cheese spreads, vegetable oils, fish oils, hydrogenated fats, whole milk powder, egg powder, sausage, bacon, vitamins A and D, chocolate, cocoa, cocoa butter, coconut fats, essential oils, margarine, lanolin, and other fatty food products, or food products containing large amounts of fatty matter which are subject to rancidity development. It is a further object of this invention to improve the action of small amounts of two or more materials which, when used together, exert a synergistic antioxidant action. By a synergistic action we mean the antioxygenic effect obtained by the two or more materials is much greater than the sum of the antioxygenic effects, if any, of the several materials when used separately.

Oils and fats often become rancid, which in the case of otherwise edible products renders them unfit for human consumption. Some of the constituents of oils and fats are known to possess the tendency to absorb or react with oxygen. Thus, rancidity development results primarily from the products formed during oxidation. The dissolved or absorbed oxygen usually reacts first to form peroxides, and the development of peroxides may be further accelerated by moisture, heat, light or catalyst. Aldehydes, ketones and acids of lower molecular weight may be formed in the further decomposition and these materials also impart an undesirable odor and taste to the oil, fat, or food product. The evaluation of rancidity is carried out by what is referred to as the active oxygen method (AOM). It pertains to the amount of peroxides developed per kilogram of fat under standard conditions of acceleration. This test is also sometimes called the Swift stability test.

A great deal of work has been done upon antioxidants for use in food products, and particularly in animal fats such as lard. Some of the suggested materials have been highly successful but extremely expensive. Some of the most effective materials have had to be incorporated in a volatile solvent, the removal of which is expensive and cannot be accomplished at most small rendering plants. Some of the suggested products have been toxic and unfit for use in food. The use of vegetable oils in antioxidant preparations has been suggested, but it has been necessary to use these oils in such quantity as seriously to lower the melting point of the lard mixtures.

The present antioxidant composition is employed in amounts not substantially greater than 0.25%, based upon the lard. Of this amount, from approximately 50% to 85% is a carrier oil. This oil is preferably a crude vegetable oil naturally containing antioxidant material such as the tocopherols. The preferred oil is crude corn oil. Crude sesame oil and crude soya oil may likewise be employed. It is possible to use refined oils to which natural or synthetic tocopherols are added, but obviously it is uneconomical first to remove the natural antioxidants and then to replace them.

The gallic acid esters employed are used in an amount from 1% to 5% of the antioxidant mixture, and preferably in the neighborhood of 2.5%. The preferred ester is propyl gallate, but other alkyl esters containing a small number of carbon atoms in the alkyl group may be substituted. In general, methyl, ethyl, propyl and butyl gallates may be employed. Lecithin, preferably in crude form, is employed in an amount from about 10% to 50% of the antioxidant mixture. Amounts from 16% to 40% are shown in the examples hereinafter set forth.

Fatty acid esters of ascorbic acid, such as ascorbyl palmitate, may likewise be incorporated in amounts from 1% to 5%, and preferably about 2.5%.

The following examples illustrate three highly satisfactory products:

| | Ex. A | Ex. B | Ex. C |
|---|---|---|---|
| | Per cent | Per cent | Per cent |
| Lecithin | 40 | 16.04 | 26.74 |
| Crude Corn Oil (containing natural tocopherols) | 58 | 78.62 | 70.59 |
| Propyl Gallate | 2 | 2.67 | 2.67 |
| Ascorbyl Palmitate | | 2.67 | |
| | 100 | 100.00 | 100.00 |

In incorporating the material into lard, it is preferred to introduce the mixture at the end of the rendering operation.

The following description illustrates a suitable method of incorporating the synergistic mixture:

The apparatus employed was a fired rendering tank of about 3500 lbs. capacity, a square shallow storage tank, and a cold roll for drawing.

The 3100-lb. charge consisted of 40% leaf and 60% cutting fats. The hogs had been chilled for 24 hours, a further period of 48 hours' refrigeration of the fats then being employed.

The hog fat was ground into the rendering tank by means of a standard meat grinder. Rendering was carried out over a period of 2 hours, the final temperature being 260° F. The resulting lard together with crackling pressings was allowed to cool in the storage tank until a temperature of 160° F. was reached (7-½ hours). A 15-lb. sample was removed for laboratory inspection.

With the temperature at 150° F., a total of 6 lbs. of antioxidant dissolved in 15 lbs. of hot lard contained in a wooden tub was added over a period of 5 minutes with rapid manual stirring with wooden paddles. Further tub rinsings (10 lbs.) were added to the tank and stirring was continued for 15 minutes after which time the lard was drawn. For this operation, a standard cold roll was employed, chilling being effected by the aid of brine.

Samples of treated lard (10 lbs.) were taken for laboratory examination.

The addition of the antioxidant to the batch increased the stability, as compared with the control sample, from ¾ to 15 A. O. M. hours at 208° F. The antioxidant here employed was 40% unbleached commercial lecithin, 50% crude corn oil, and 2% propyl gallate.

The following data illustrates the synergistic character of the compositions herein described:

|  | A. O. M. Hours at 208° F. | | |
| --- | --- | --- | --- |
|  | A | B | C |
| Control | ¾ | 1½ | 3¼ |
| Lard with 0.005% PG | 9¼ | 24½ | 24 |
| Lard with 0.10% Lec | 3¼ | 3¾ |  |
| Lard with 0.145% CO | 1 | 1½ |  |
| Lard with 0.10% Lec. and 0.145% CO | 3½ | 3½ | 8¼ |
| Lard with 0.005% PG and 0.10% Lec | 14 |  |  |
| Lard with 0.005% PG and 0.145% CO | 10½ |  |  |
| Lard with 0.005% PG, 0.10% Lec., and 0.145% CO | 15 | 35 | 38 |

When 0.187% of the compound of Example A on page 4 was added to the lard of column C above, the stability was increased from 3¼ A. O. M. hours to 32 hours. When the same amount of Example B was added to this lard, its index was increased to 49 A. O. M. hours.

A. O. M. hours at 208° F.
Control _____ 2½
Lard with 0.01% PG _____ 53
Lard with 0.10% Lec. and 0.14% CO _____ 5
Lard with 0.01% PG, 0.10% Lec. and 0.14% CO _____ 66
Control _____ 2½
Lard with 0.001% PG _____ 9½
Lard with 0.10% Lec. and 0.15% CO _____ 5
Lard with 0.001% PG, 0.10% Lec. and 0.15% CO _____ 16

PG—Propyl Gallate.
Lec.—Unbleached lecithin.
CO—Crude Corn Oil (contains tocopherols).

Tests on a control lard having a 9½ hr. A. O. M. stability index showed that the addition of ⅛ of 1% of the antioxidant in Example A above increased the number of A. O. M. hours to 32¼; and ¼ of 1% increased it to 56 hours.

⅛ of 1% of Example B added to the same lard increased the A. O. M. hours to 53; and ¼ of 1% increased the index to approximately 75 hours.

⅛ of 1% of Example C increased the A. O. M. hours to 31; and ¼ of 1% increased it to approximately 55 hours.

The following data show a test on refined cottonseed oil:

A. O. M. hours at 208° F.
Control _____ 7
Oil with .001% of a mixture consisting of 0.005% PG, 0.10% Lec. and 0.145% CO __ 8
Oil plus 0.01% same mixture _____ 13
Oil plus 0.10% same mixture _____ 14
Oil plus 0.2% same mixture _____ 19

One A. O. M. hour at 208° F. is approximately equivalent to 16 days' keeping time at 98° F.

The antioxidants of the present invention not only are relatively inexpensive but they may be dissolved in the minute proportion of carrier oil required and thus distributed through the product to be stabilized without the necessity of a special solvent or expensive processes or equipment.

The foregoing detailed description has been given for clearness of understanding only, and no unnecessary limitations should be understood therefrom.

What we claim as new, and desire to secure by Letters Patent, is:

1. An antioxidant composition for fatty materials comprising a vegetable carrier oil and a synergistic mixture of a tocopherol, a low molecular weight alkyl ester of gallic acid, and lecithin.

2. An antioxidant composition comprising approximately 58 parts crude corn oil, 40 parts lecithin, and 2 parts propyl gallate.

3. An antioxidant composition comprising approximately 70 parts crude corn oil, 27 parts lecithin, and 3 parts propyl gallate.

4. An antioxidant composition comprising approximately 79 parts crude corn oil, 16 parts lecithin, 2½ parts propyl gallate, and 2½ parts ascorbyl palmitate.

5. A fatty composition consisting predominantly of glycerides of fatty acids and containing not substantially over 0.25% of an antioxidant composition comprising 50–85% of a tocopherol-containing carrier oil, 10–50% lecithin, 1–5% of a low molecular weight ester of gallic acid, and 0–5% ascorbyl ester.

6. A fatty composition consisting predominantly of glycerides of fatty acids and containing not substantially over 0.25% of an antioxidant composition comprising a carrier oil, and a synergistic mixture of lecithin, a low molecular weight ester of gallic acid, and tocopherols.

7. A composition as set forth in claim 5, in which the glyceride is predominantly refined cottonseed oil.

8. A composition as set forth in claim 5, in which the glyceride is predominantly lard.

9. An antioxidant as set forth in claim 1 in which the carrier oil is crude sesame oil.

10. An antioxidant as set forth in claim 1 in which the carrier oil is crude soya oil.

11. An antioxidant for fatty materials comprising a synergistic mixture of 50–85% of a tocopherol-containing carrier oil, 10–50% of lecithin, 1–5% of a low molecular weight ester of gallic acid, and 0–5% of an ester of ascorbic acid.

12. An antioxidant as set forth in claim 11, in which the ester of ascorbic acid is ascorbyl palmitate.

13. A fatty composition consisting predominantly of glycerides of fatty acids and containing not substantially over 0.25% of an antioxidant composition comprising 58 parts crude corn oil, 40 parts lecithin and 2 parts propyl gallate.

14. A fatty composition consisting predominantly of glycerides of fatty acids and containing not substantially over 0.25% of an antioxidant composition comprising 70 parts crude corn oil, 27 parts lecithin and 3 parts propyl gallate.

15. A fatty composition consisting predominantly of glycerides of fatty acids and containing not substantially over 0.25% of an antioxidant composition comprising 79 parts crude corn oil, 16 parts lecithin, 2½ parts propyl gallate, and 2½ parts ascorbyl palmitate.

16. An antioxidant composition for fatty materials comprising a synergistic mixture including 50–85% of crude corn oil, 10–50% of lecithin, 1–5% of a low molecular weight ester of gallic acid, and 0–5% of an ascorbic acid ester.

LLOYD A. HALL.
LEON LEE GERSHBEIN.

REFERENCES CITED

The following references are of record in the file of this patent:

UNITED STATES PATENTS

| Number | Name | Date |
| --- | --- | --- |
| 2,282,811 | Musher | May 12, 1942 |
| 2,383,815 | Riemenschneider | Aug. 28, 1945 |

OTHER REFERENCES

Golumbic et al., Oil & Soap, August 1942, pages 144–145.

Bergel, Chem. & Ind., April 1944, pages 127–128.

Higgins et al., Oil & Soap, Sept. 1944, pages 277–279.

Mattill, Oil & Soap, Jan. 1945, pages 1–3.

Riemenschneider et al., Oil & Soap, April 1944, pages 98–100.